United States Patent
Wu (10) Patent No.: US 9,650,102 B1
(45) Date of Patent: May 16, 2017

(54) COLLAPSIBLE CONTROL LEVER

(71) Applicant: FLO MOTORSPORTS, Fountain Hills, AZ (US)

(72) Inventor: Judy Wu, Changhua County (TW)

(73) Assignee: Flo Motorsports, Fountain Hills, AZ (US)

( * ) Notice: Subject to any disclaimer, the term of this patent is extended or adjusted under 35 U.S.C. 154(b) by 0 days.

(21) Appl. No.: 15/002,344

(22) Filed: Jan. 20, 2016

(51) Int. Cl.
    *G05G 1/04* (2006.01)
    *B62K 23/06* (2006.01)
    *B62L 3/02* (2006.01)

(52) U.S. Cl.
    CPC .............. *B62K 23/06* (2013.01); *G05G 1/04* (2013.01); *B62L 3/02* (2013.01)

(58) Field of Classification Search
    CPC .. B62K 23/06; B62J 23/00; B62L 3/02; B60T 7/102; G05G 1/04; G05G 9/047; Y10T 74/2051
    See application file for complete search history.

(56) References Cited

U.S. PATENT DOCUMENTS

| | | | |
|---|---|---|---|
| 6,047,611 A | 4/2000 | Warren | |
| 6,393,936 B1 | 5/2002 | Barnett | |
| 6,578,445 B2 * | 6/2003 | Barnett | B62K 23/06 74/502.2 |
| 7,204,350 B2 * | 4/2007 | Lumpkin | B62L 3/023 188/24.14 |
| 7,921,747 B2 | 4/2011 | Barnett | |
| 8,720,303 B2 | 5/2014 | Wu | |
| 2012/0006146 A1 * | 1/2012 | Warren | G05G 1/04 74/524 |

FOREIGN PATENT DOCUMENTS

| | | |
|---|---|---|
| TW | M434721 U | 8/2012 |
| TW | M434726 U | 8/2012 |

* cited by examiner

*Primary Examiner* — Adam D Rogers
(74) *Attorney, Agent, or Firm* — Rosenberg, Klein & Lee (57) ABSTRACT

A collapsible control lever comprises an assembling member, a rotation seat, a first torsion spring, an handle, and a pivoting rod. One end of the rotation seat is pivoted to the assembling member. The first torsion spring is assembled between the assembling member and the rotation seat. One end of the handle has a ball socket. One end of the pivoting rod has a ball head which is passing through and pivoted to the ball socket and the other end thereof is passing through and assembled to the rotation seat to provide to be folded and rotated in multiple angles with an external force. It provides a multi-angle collapsible control lever to increase the ranges of bending and rotation. A single element is provided a three-dimension range to achieve the effects of collapsing and rotating and the structure is simplified.

8 Claims, 14 Drawing Sheets

COLLAPSIBLE CONTROL LEVER

BACKGROUND OF THE INVENTION

1. Field of the Invention

The present invention relates to a collapsible control lever which is applied to a bicycle or a motorcycle to control the operation of the brake or clutch. The lever will fold itself under any impact or crash so it would not result in serious damage.

2. Description of Related Art

The brake levers or clutch levers of motorcycles of bicycles are generally the most outwardly installed portion on the handlebar. Any strike, impact or even a minor spill could bend or break the levers, for instance, in the event of the motorcycle or bicycle tipping from its kickstand or work stand. Consequently, the rider would have to discontinue the race or off-road riding. It is even more troublesome while the rider is in a great distance away from the city.

There have been quite a few prior arts disclosed, for example, TW patent no. M434721 and M434726, and U.S. Pat. No. 8,720,303, U.S. Pat. No. 6,047,611, U.S. Pat. No. 6,393,936, U.S. Pat. No. 6,578,445, and U.S. Pat. No. 7,921,747, attempting to overcome the above-mentioned issues.

Please refer to U.S. Pat. No. 6,047,611, it disclosed that the collapsible lever includes three sections: a pivot stand 26, a base 66, and a handle 68. The pivot stand 26 is used for fixing the handle. A pivot shaft 60 is further interposed between the pivot stand 26 and the base 64 for providing the base 64 to oscillate in a limiting angle and be braked. The base 64 has two frame portions 92, 98 which are pivoted with each other with a bolt 124. It may provide the frame portion 98 to contact and slide relative to the sliding surfaces 112, 116 of the frame portion 92 with the sliding surfaces 114, 118 of the frame portion 98. The frame portion 98 has an U-shaped mount 96 for pivoting with the hinge pivot 74 to rotate. The combination of the bolt 124 and frame portions 92, 98 is provided an effect of collapsible pivot, and the other combination of the hinge pivot 74, the handle 68, and the U-shaped mount 96 is also provided the effect of collapsible pivot. Because the two pivoting positions have different directions, they provide an effect of multi-directional collapsible rotation.

One of the two rotation directions of U.S. Pat. No. 6,047,611 is the combination of the bolt 124 and the frame portions 92, 98 for providing the handle 68 to pivot upward and downward relative to a bicycle while riding (that is, pivoted with the second axis of rotation 72), and the other thereof is the combination of the hinge pivot 74, handle 68, the U-shaped mount 96 for providing the handle 68 to pivot between the handle grip 24 and a front direction of the bicycle while riding. The rotation angle of the handle 6 is ranged in 30 degree. The sliding surfaces 114, 118, 112, 116 are engaged with each other with convex-concave structures. Once the frame portion 98 is rotated relative to the frame portion 92, the coil spring 136 may be compressed by the flat cap 138 which the bolt 124 is passing through till the convex structure of the frame portions 98, 92 is slid to the concave structure thereof to abut against the coil spring 136 and back to a convex surface which is arranged between two concave surfaces quickly to be positioned while the convex sliding surfaces of the frame portions 98, 92 are abutted against with one another although the sliding surfaces 114, 118, 112, 116 may be slid relative to each other. Therefore, the fame portions 98, 92 may be not reset automatically and may not be operated normally while they are pivoted to a specific angle (that is, the handle 68 is oscillated upward or downward). The coil spring 136 is just provided the function of quickly positioning. Once the handle 68 is pivoted (or oscillated) upward or downward, the handle 68 needs to be manually adjusted to general braking position to provide the operation of brake or clutch. The lever of U.S. Pat. No. 6,047,611 is inconvenient in operation. Simultaneously, U.S. Pat. No. 6,047,611 needs more elements to assemble to achieve the pivot in two different directions. The structure and assembly are complicated to achieve the effect of multi-directional pivot or oscillation to prevent from being damaged. It can be seen that the pivot of the oscillating direction of each combination is linear and two linear movements result in multi-directional pivot or oscillation.

The linear movement of each combination may be not reset automatically. U.S. Pat. No. 6,047,611 analyzed by Kinematic of Machinery may achieve multi-directional pivot or oscillation by a connecting rod which includes three pieces and two axes.

The prior art is used two axes to provide other elements to rotate relatively. The arrangement positions of the two axes are respectively in a forward and horizontal direction and an upward and vertical direction to provide the effect of multi-directional collapsible rotation.

Please reference to U.S. Pat. No. 6,393,936, U.S. Pat. No. 6,578,445, and U.S. Pat. No. 7,921,747, they disclosed that a collapsible control lever. It includes a handlebar mount 68, an intermediate section 70 and a lever section 72. The handlebar mount 68 is fixed at the handlebar 50 with the clamp plate 76 and the clamp bolts 78. The intermediate section 70 are pivoted to the handlebar mount 68 with a lever pivot bolt 100 to provide the intermediate section 70 to rotate relative to the handlebar mount 68. One end of the lever section 72 has a pivot portion 90 and pivoted to the intermediate section 70 with a deflection pivot bolt 104 to rotate relatively. The lever section 72 is rotated toward the direction distant from the handlebar 50 and provided to rotated outwardly and relative to the intermediate section 70. The intermediate section 70 is rotated relative to the handlebar mount 68 and toward the handlebar 50 and provided the operation of brake or clutch. The above mentioned two rotating directions are limited by the direction of force. It only provides the rotation whose direction is synchronized with the direction of force. It may not achieve the effect of mutual rotation.

The above mentioned U.S. patents, U.S. Pat. No. 6,393,936, U.S. Pat. No. 6,578,445, and U.S. Pat. No. 7,921,747, are cooperated with the lever pivot bolt 100 to rotate relative to the handlebar mount 68 by the intermediate section 70 so that the lever section 72 and the intermediate section 70 are rotated close to the handlebar 50 together to mainly provide the operation of brake or clutch. The pivot angle forced by an external force is limited. Taking the riding direction for example, it is only provided the lever section 72 to rotate in an angle backwardly. Furthermore, the pivot portion 90 arranged at one end of the lever section 72 is cooperated with the deflection pivot bolt 104 to pivot to the intermediate section 70. Taking the riding direction for example, it is only provided the lever section 72 the rotate relative to the intermediate section 70 in the forward and horizontal direction. From the above mentioned contents, it may be known that the lever pivot bolt 100 and the deflection pivot bolt 104 are almost in parallel and respectively provided the intermediate section 70 and the lever section 72 to rotate close or opposite to the handlebar 50. The rotation angle is limited by the rotation in the forward and horizontal direction. It can be seen that the rotation angle is limited extremely. It is mainly provided the lever section 72 to rotate relative to the intermediate section 70 toward the forward and horizontal direction with the pivot portion 90. It is impossible to provide to rotate in more other angles.

The above mentioned U.S. patents, U.S. Pat. No. 6,393, 936, U.S. Pat. No. 6,578,445, and U.S. Pat. No. 7,921,747, analyzed by Kinematic of Machinery may be achieved the pivot range in forward and horizontal direction and the multi connecting rods include two pieces and one axis.

However, the folded range of each rotation shaft may be limited by the elements which are assembled with each other and only provided two-dimensional folding and rotation in a specific angle rotation range. It must depend on the two rotation shafts to be folded and rotated in three dimensions.

In view of the foregoing circumstances, the inventor has invested a lot of time to study the relevant knowledge, compare the pros and cons, research and develop related products. After quite many experiments and tests, the "collapsible control lever" of this invention is eventually launched to improve the foregoing shortcomings, to meet the public use.

SUMMARY OF THE INVENTION

The main object of this invention is providing a collapsible control lever. The bending and rotation ranges may be improved. The three-dimensional angled folding rotation may be achieved by one element and the structure may be simplified.

In order to achieve above mentioned object, a collapsible control lever comprises an assembling member, a rotation seat, a first torsion spring, a handle, and a pivoting rod, wherein: the assembling member has an assembly portion, one end of the rotation seat is pivoted to the assemble portion, two ends of the first torsion spring are respectively fixed to the assembly portion and the rotation seat, and the rotation seat is pivoted relative to the assembly portion and then reset by the first torsion spring; and a ball socket is arranged at one end of the handle, a ball head is arranged at one end of the pivoting rod and pivoted at the ball socket, and the other end of the pivoting rod opposite to the end arranged the ball head is assembled to the rotation seat, and a surface of the ball socket of the handle is freely pivoted or oscillated and moved non-directionally relative to a surface of the ball head.

In some embodiments, the handle has a cross groove fluidly communicated with the ball socket, the rotation seat has a through hole, the pivoting rod includes an assembly section connected with the ball head, the assembly section of the pivoting rod is passing through the cross groove and pivoted to one end of the through hole and then a fixing screw is passing through the assembly portion and screwed with the assembly section for fixing.

In some embodiments, the handle is extended to form a cylinder arranged adjacent to the ball socket, the collapsible control lever further comprises a second torsion spring covered the cylinder, two ends of the second torsion spring are respectively fixed to the cylinder and the rotation seat, and the handle is pivoted relative to the pivoting rod and then reset by the second torsion spring.

The collapsible control lever may further comprise a cover bushing for covering the cylinder and shielding the second torsion spring, a concave groove is arranged at a tail end of the cylinder in an axial direction, and a fixing member is embedded in the concave groove and abutted against a surface of the cover bushing so that the cover bushing is positioned at the cylinder.

In some embodiments, an arc side positioning groove is arranged at a peripheral of the rotation seat along a rotating direction, the assembling member has a positioning hole fluidly communicated with the assembly portion, a positioning bolt is passing through the positioning hole and a peripheral of the positioning bolt is ranged in the arc side groove, and a locking screw is screwed at the positioning hole and abutted against and limited the positioning bolt to prevent from separating from the positioning hole.

In some embodiments, an adjusting screw hole is formed in the cross groove, a convex block is arranged at the end of rotation seat extended outwardly and toward the cross groove, one end of an adjusting screw is screwed with the adjusting screw hole and axially moved relative to the adjusting screw hole so that the other end of the adjusting screw opposite to the end screwed with the adjusting screw hole is protruded to the cross groove and abutted against and limited a surface of the convex block.

In some embodiments, the arc side positioning groove is ranged between 0.334 and 0.667 of a circumference of the rotation seat for providing the rotation seat to rotate relative to the assembling member angled from 120 degree to 240 degree.

In some embodiments, the cross groove of the handle provides a moving range of the assembly section of the pivoting rod while the handle is folded and rotated forwardly, and the handle is folded and rotated forwardly and in a largest angle of 120 degree with the ball socket being relative to the ball head of the pivoting rod.

The various objects and advantages of the present invention will be more readily understood from the following detailed description when read in conjunction with the appended drawing.

DETAILED DESCRIPTION OF THE INVENTION

To describe clearly that the present invention achieves the foregoing object and function, the technical features and desired function are described with reference to a preferred embodiment and accompanying drawings.

Please reference to FIGS. 1-5, a collapsible control lever of the present invention may comprise an assembling member 1, a rotation seat 2, a first torsion spring 3, a handle 4, and a pivoting rod 5. The assembling member 1 has an assembly portion 11. One end of the rotation seat 2 is pivoted to the assemble portion 11. The first torsion spring 3 is arranged between the assembly portion 11 and the rotation seat 2. Two ends of the first torsion spring 3 are respectively fixed to the assembly portion 11 and the rotation seat 2. The rotation seat 2 is pivoted relative to the assembly portion 11 and then reset by the first torsion spring 3. A ball socket 41 is arranged at one end of the handle 4. A ball head 51 is arranged at one end of the pivoting rod 5 and pivoted at the ball socket 41. A surface of the ball socket 41 of the handle 4 is freely pivoted (or oscillated) and moved non-directionally relative to a surface of the ball head 51 (shown as in FIG. 5, the handle 4 may be moved from the solid-line position to the dash-line position, and the moving direction of the handle 4 is moved in multi directions shown as the arrow, and the multi-directional moving range of the handle 4 is ranged in the spherical track range illustrated by the dash line). The other end of the pivoting rod 5 opposite to the end arranged the ball head 51 is assembled to the rotation seat 2.

Figure 4:
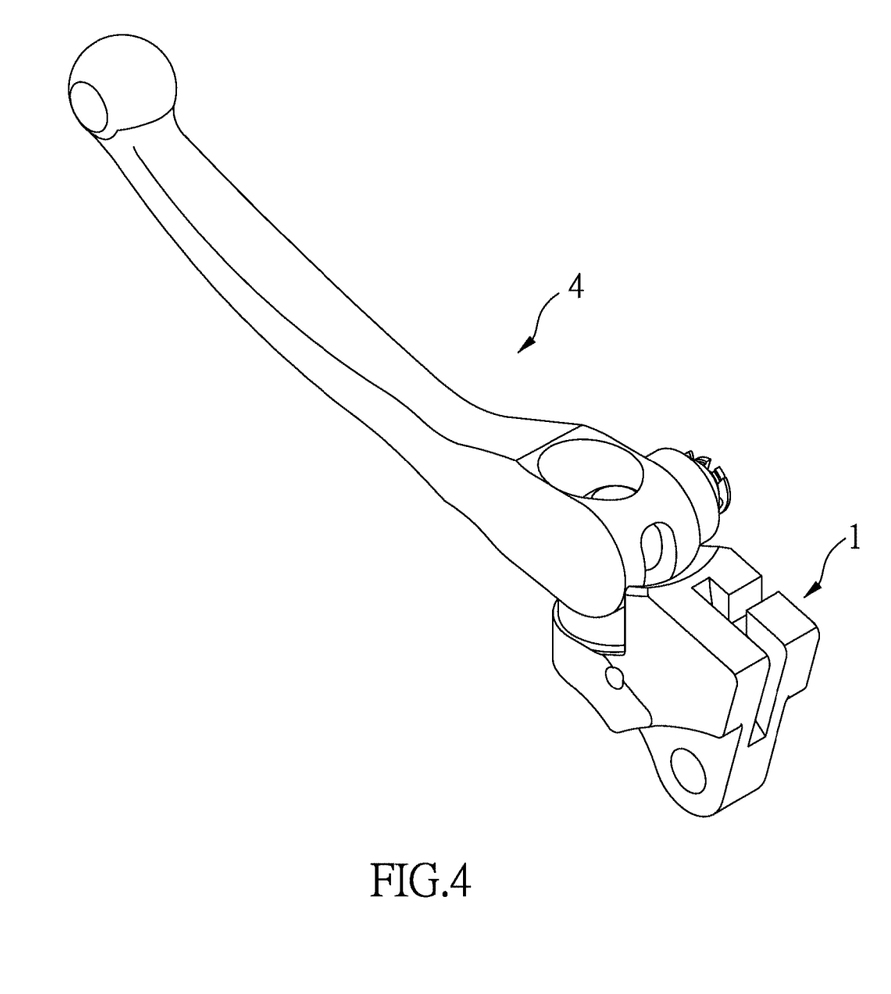
FIG. 4 is a perspective view of the collapsible control lever of the present invention viewed in another angle.
Figure 5:
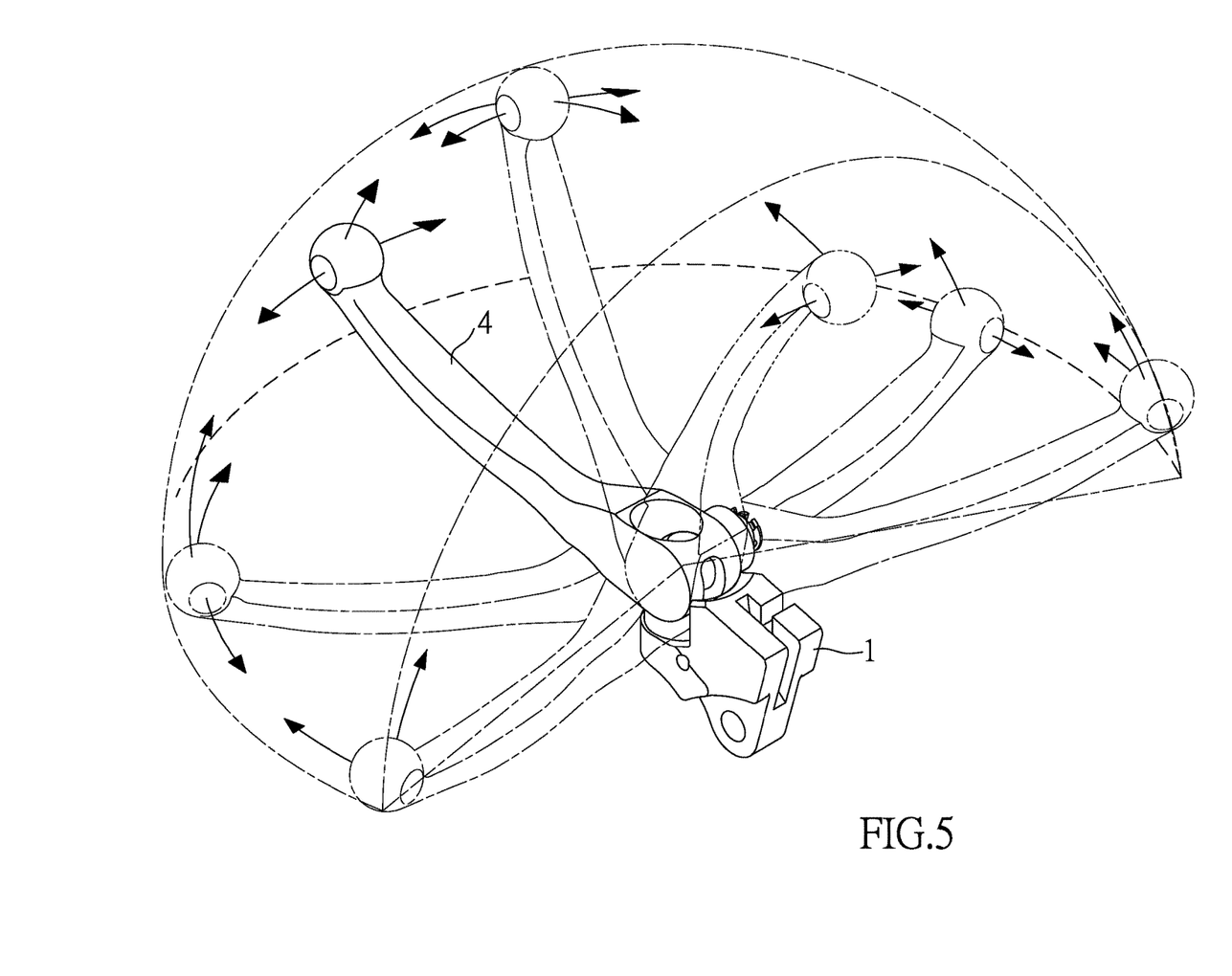
FIG. 5 is a view of the collapsible control lever of the present invention while the handle is oscillated as a spherical track.

Please refer to FIGS. 4 and 5, the assembling member 1 may be mounted on a grip of a bicycle or a motorcycle (not shown), such like the use of brake or clutch. Based on the above mentioned structure, once the bicycle or motorcycle is slid and tilted and the end of the handle 4 of the collapsible control lever opposite to the ball socket 41 is collided with ground or other object, such as vehicles or pedestrian, the handle 4 may be rotated relative to the pivoting rod 5 with a three-dimensional rotation based on a rotation surface which is a surface of the ball socket 41. It may achieve to suitably fold the collapsible control lever to differentiate from the conventional handlebar which needs two shafts to achieve the three-dimensional rotation and folding. It may also simplify the structure and elements. That is, it may achieve the same characteristic(s) or function(s) with less elements.

Especially, the surface of the ball socket 41 of the handle 4 is pivoted corresponding to the surface of the ball head 51 so as to make the surface of the handle 4 be capable for moving relative to the surface of the ball head 51. Therefore, when the vehicle (bicycle or motorcycle) installed the collapsible control lever of the present invention is tilted laterally and fallen down and the handle 4 is collided to the ground, the handle 4 may be freely pivoted (oscillated) relative to the ball head 51 and moved non-directionally so that the rider may be not injured by the handle 4 which is directly arranged upwardly while the rider is fallen down and has a forward inertia force.

Figure 1:
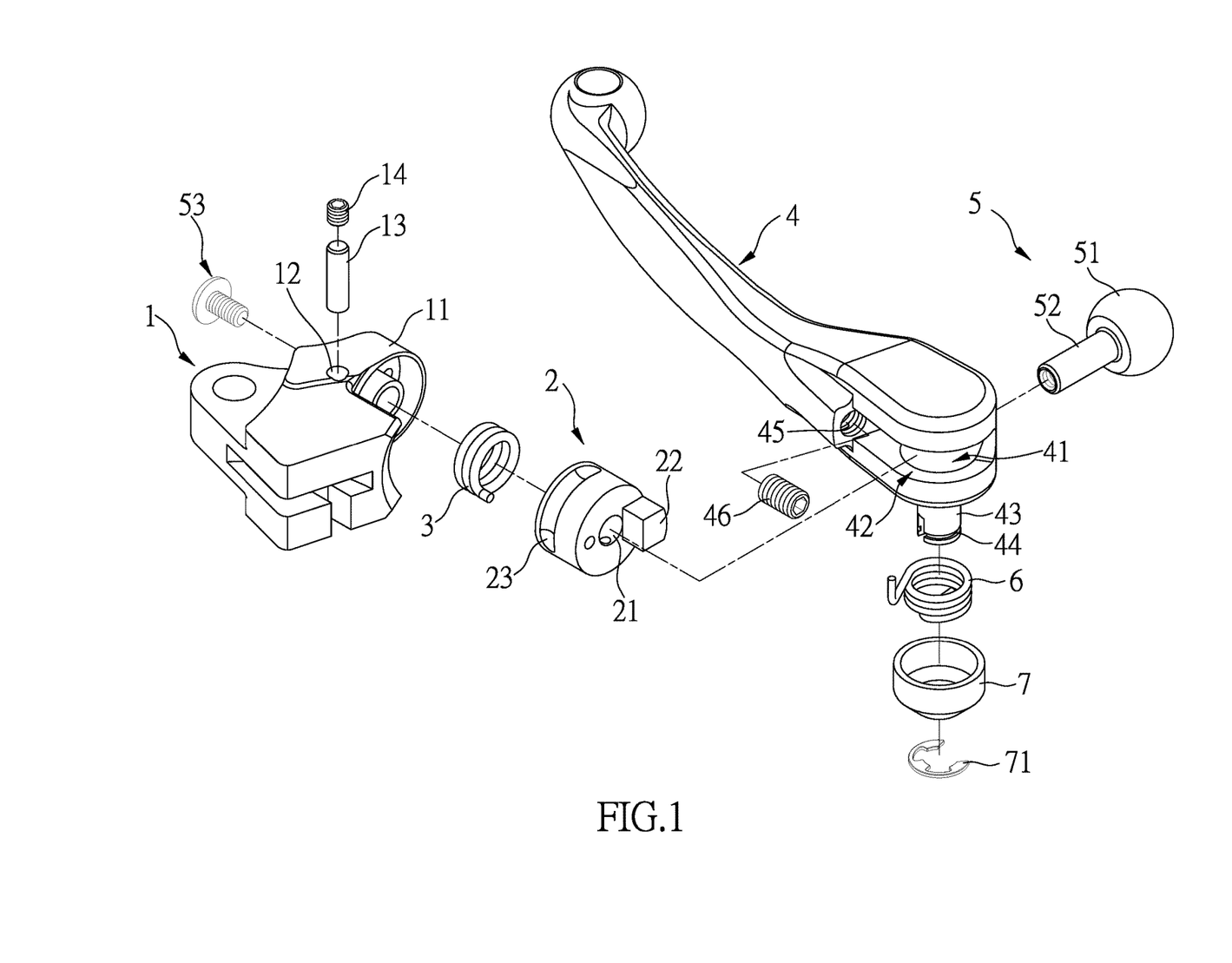
FIG. 1 is a exploded view of a collapsible control lever of the present invention.
Figure 2:
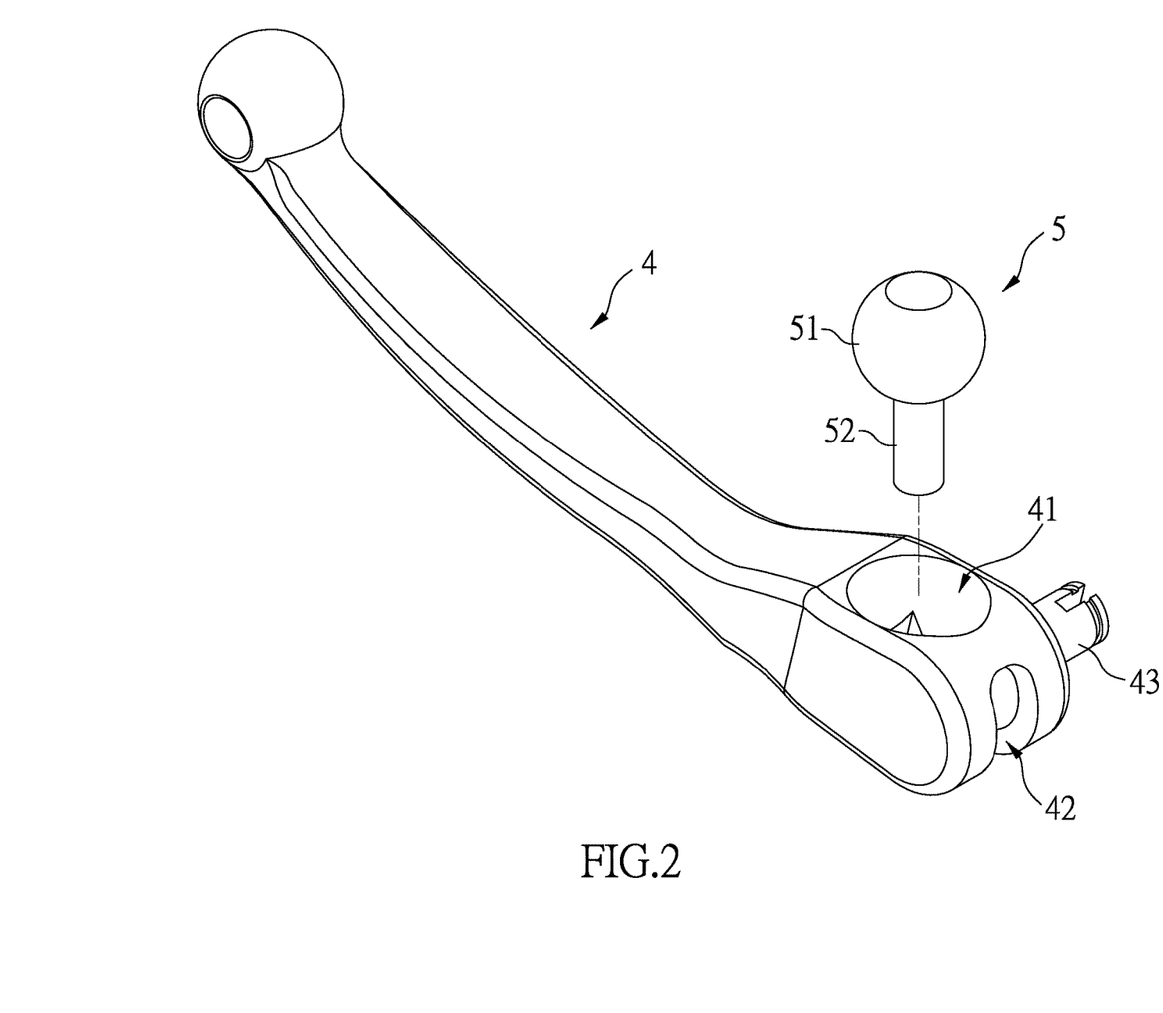
FIG. 2 is an exploded view of an handle and a pivoting rod of the collapsible control lever of the present invention viewed in another angle.
Figure 3:
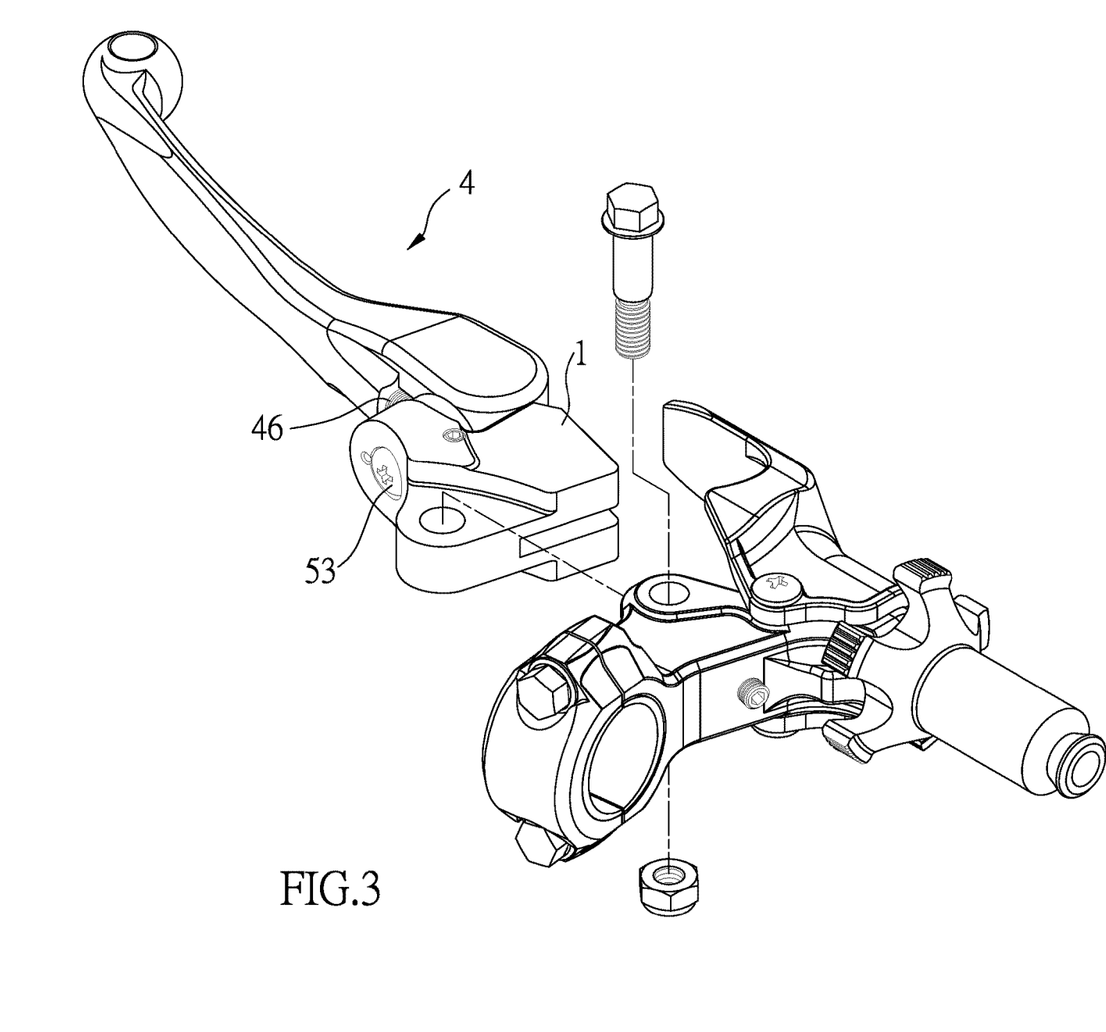
FIG. 3 is a perspective view of the collapsible control lever of the present invention while being assembled to a connection base.
Figure 6:
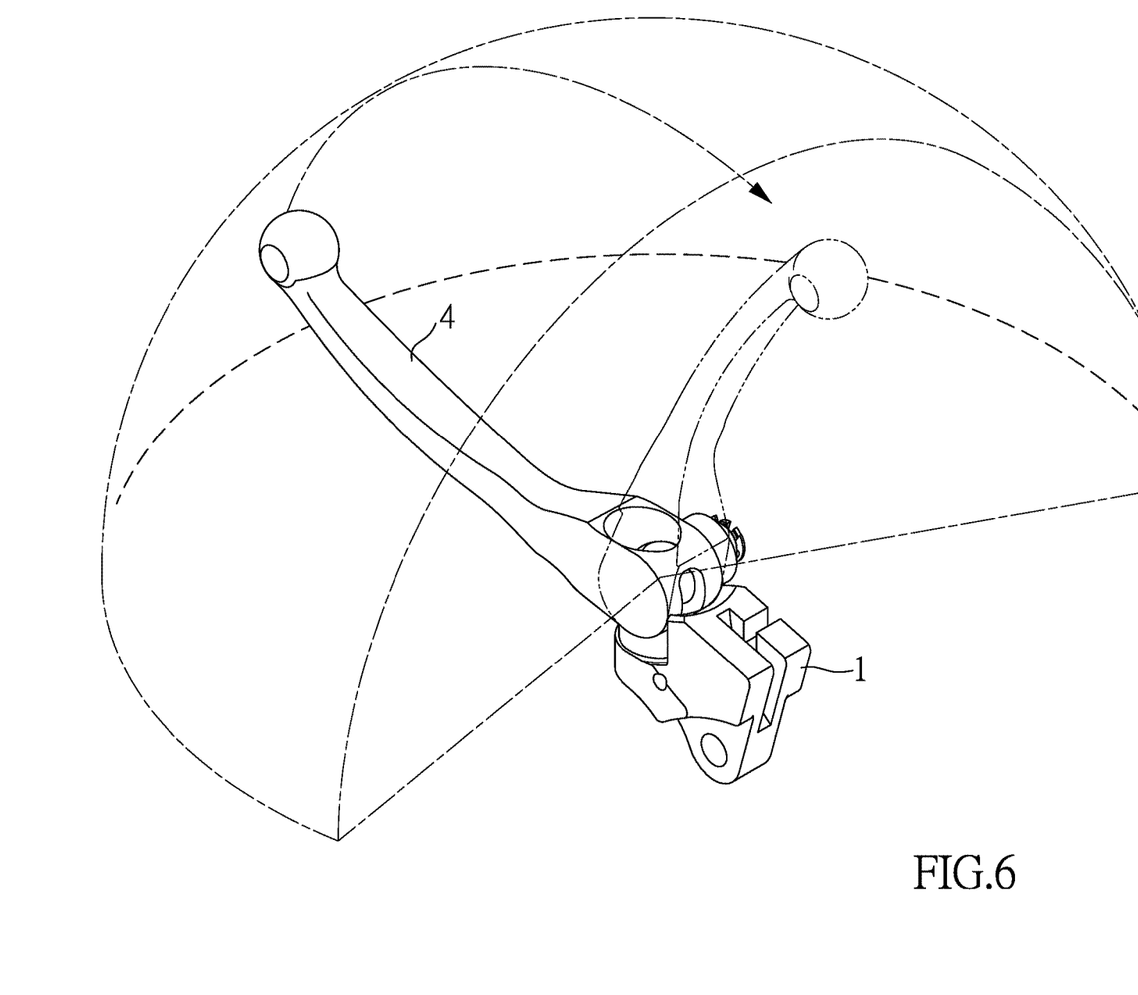
FIG. 6 is a perspective view of the collapsible control lever of the present invention while the handle is collapsible rotated relative to the assembling member.
Figure 8:
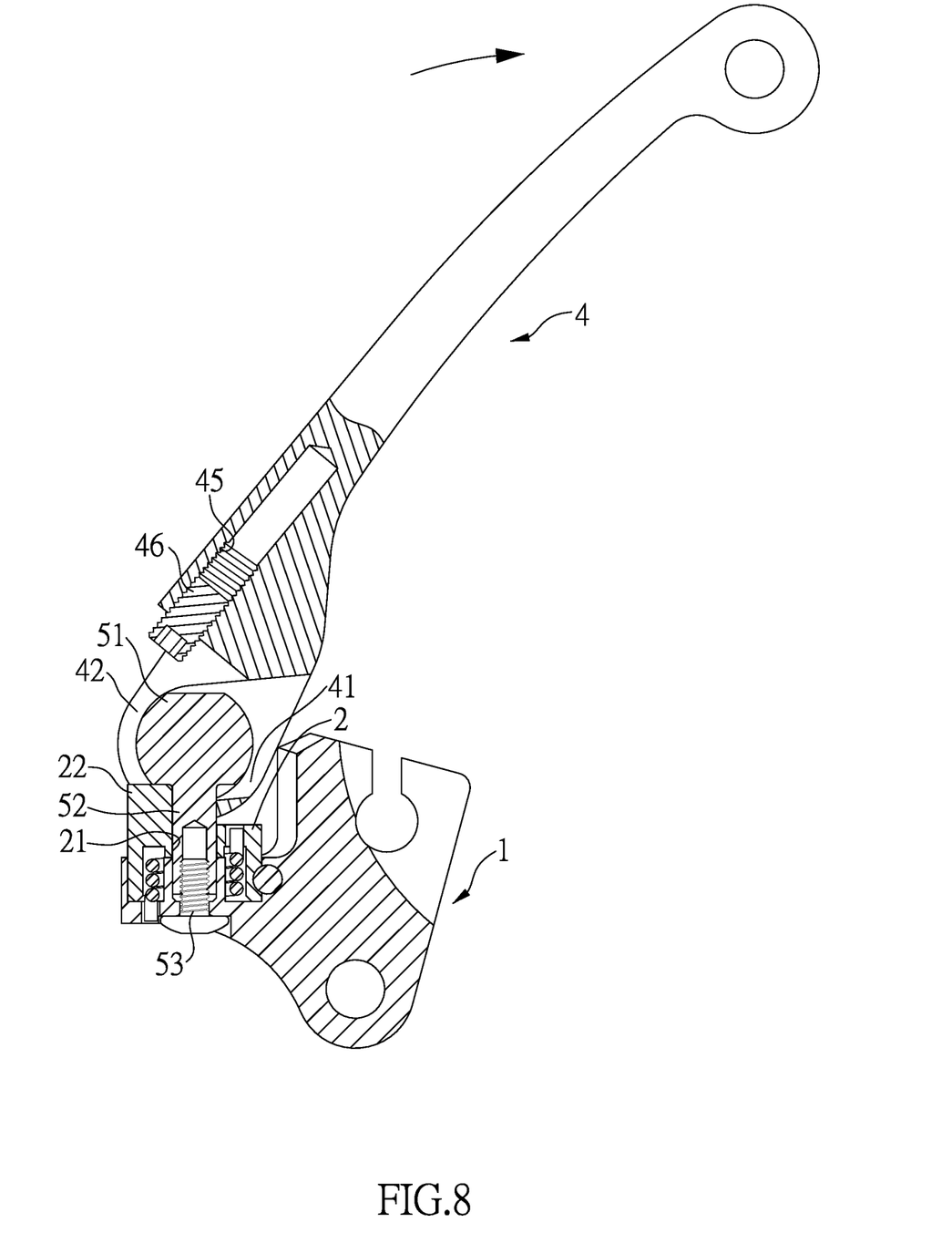
FIG. 8 is a cross-sectional view of the collapsible control lever of the present invention while the handle is collapsible rotated relative to the assembling member.

Please refer to FIGS. 1, 6, and 8, the handle 4 has a cross groove 42 fluidly communicated with the ball socket 41. The rotation seat 2 has a through hole 21. The pivoting rod 5 includes an assembly section 52 connected with the ball head 51. The assembly section 52 of the pivoting rod 5 is passing through the cross groove 42 and pivoted to one end of the through hole 21 and then a fixing screw 53 is passing through the assembly portion 11 and screwed with the assembly section 52 for fixing. With the ball head 51 of the pivoting rod 5 is pivoted to the ball socket 41 and the assembly section 52 of the pivoting rod 5 is installed in the through hole 21 of the rotation seat 2 and fixed by the fixing screw 53, the handle 4 may effectively rotate relative to the pivoting rod 5 in three dimensions and simultaneously the fixing screw 53 may effectively make the assembly section 52 of the pivoting rod 5 install into the through hole 21 of the rotation seat 2 firmly while the handle 4 is influenced by an external force.

Figure 9:
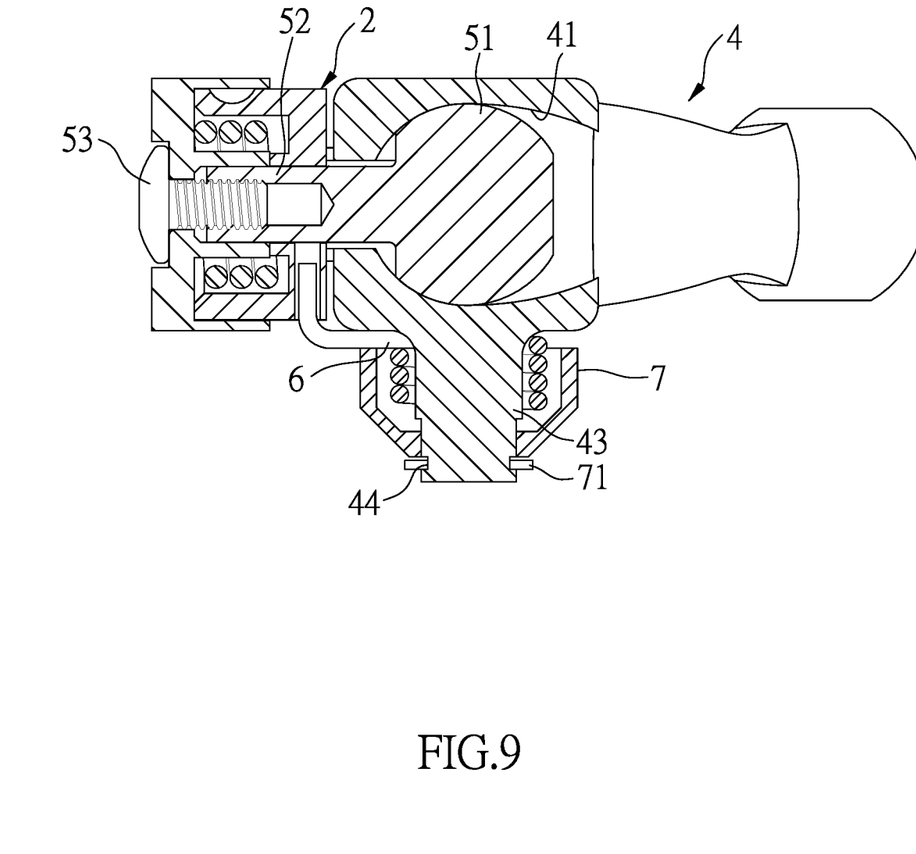
FIG. 9 is a cross-sectional view of the collapsible control lever of the present invention while being assembled.

Please refer to FIGS. 1 and 9, the handle 4 is extended to form a cylinder 43 arranged adjacent to the ball socket 41. The collapsible control lever of the present invention further comprises a second torsion spring 6 covered the cylinder 43. Two ends of the second torsion spring 6 are respectively fixed to the cylinder 43 and the rotation seat 2. The handle 4 is pivoted relative to the pivoting rod 5 and then reset by the second torsion spring 6. The collapsible control lever of the present invention may further comprise a cover bushing 7 for covering the cylinder 43 and shielding the second torsion spring 6. A concave groove 44 is arranged at a tail end of the cylinder 43 in an axial direction. A fixing member 71 is embedded in the concave groove 44 and abutted against a surface of the cover bushing 7 so that the cover bushing 7 is positioned at the cylinder 43. Because the second torsion spring 6 is covered the cylinder and two ends of the second torsion spring 6 are respectively fixed to the cylinder 43 and the rotation seat 2, the handle 4 may be reset by the second torsion spring 6 while the handle 4 is influenced by the external force. Furthermore, the cover bushing 7 is covered the cylinder 43 and fixed by the fixing member 71 so that the cover bushing 7 may effectively shielding the second torsion spring 6 to prevent from the needless collision and smirch to keep better cleanness.

Figure 7:
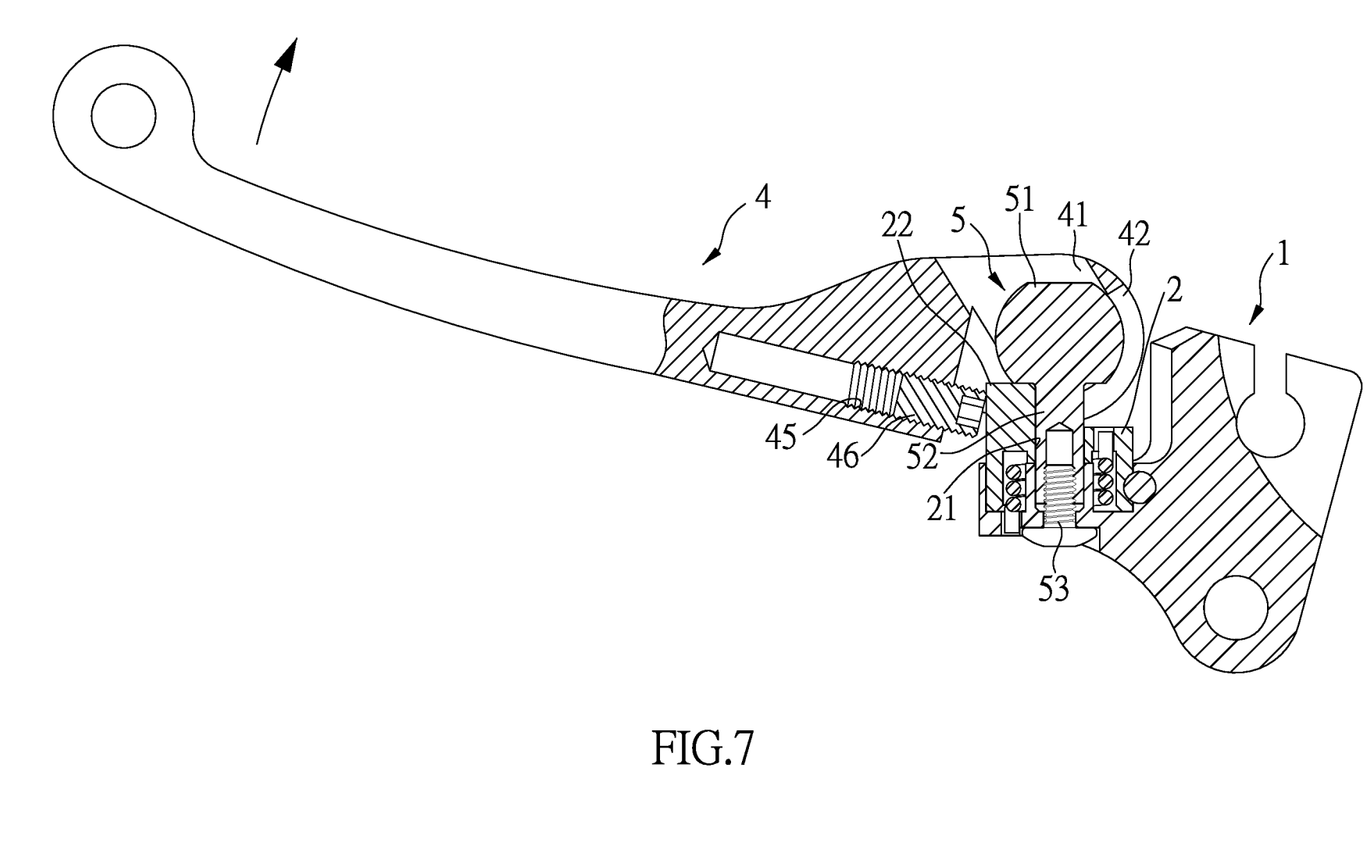
FIG. 7 is a cross-sectional view of the collapsible control lever of the present invention before the handle is collapsible rotated relative to the assembling member.

Please refer to FIGS. 1 and 7, an adjusting screw hole 45 is formed in the cross groove 42 of the handle 4. A convex block 22 is arranged at the end of rotation seat 2 extended outwardly and toward the cross groove 42. One end of an adjusting screw 46 is screwed with the adjusting screw hole 45 and axially moved relative to the adjusting screw hole 45 so that the other end of the adjusting screw 46 opposite to the end screwed with the adjusting screw hole 45 is protruded to the cross groove 42 and abutted against and limited a surface of the convex block 22. The distance of the collapsible control lever of the present invention installed to the grip to adapt various users with different long fingers to press the handle 4 through rotating the adjusting screw 4 relative to the adjusting screw hole 45 to move axially and further adjusting an angle angled between the handle 4 and the rotation seat 2.

Please refer to FIGS. 6 and 8, it must be mentioned that the handle 4 is folded and rotated in a largest angle which is 120 degree from an original position toward a front direction (the front direction means that a front direction of a vehicle). When the handle 4 is forced from a rear direction toward the front direction, the handle 4 may be folded and rotated forwardly and in the largest angle of 120 degree with the ball socket 41 being relative to the ball head 51 of the pivoting rod 5. The cross groove 42 of the handle 4 may provide a moving range of the assembly section 52 of the pivoting rod 5 while the handle 4 is folded and rotated forwardly. And simultaneously, the handle 4 may twist the second torsion spring 6 tightly. And then, the second torsion spring 6 may be recovered and the handle 4 may be driven to reset while the external force is removed.

Figure 10:
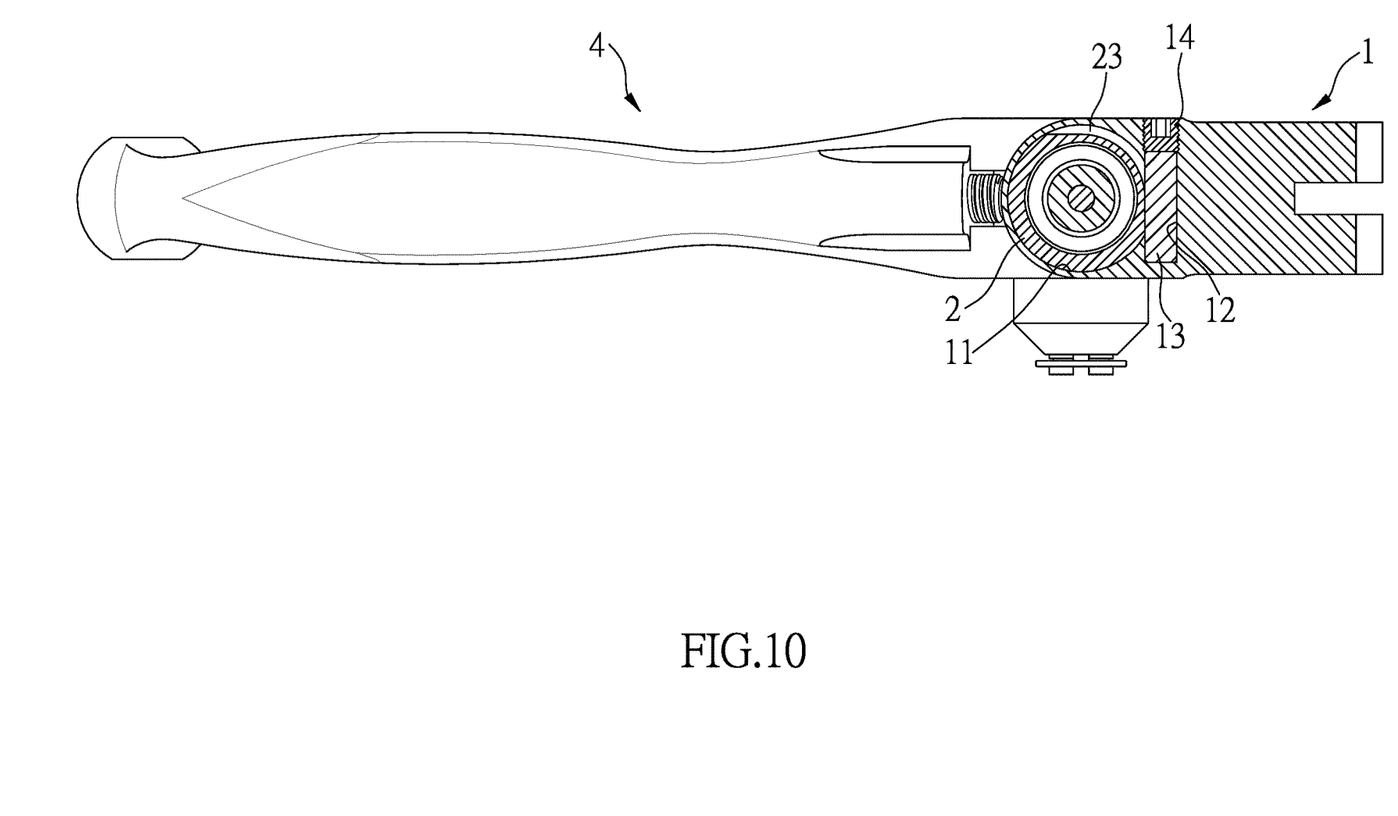
FIG. 10 is a cross-sectional view of the collapsible control lever of the present invention before the handle and a rotation seat are collapsible rotated relative to the assembling member.

It is worth mentioning that an arc side positioning groove 23 is arranged at a peripheral of the rotation seat 2 along a rotating direction. The assembling member 1 has a positioning hole 12 fluidly communicated with the assembly portion 11. A positioning bolt 13 is passing through the positioning hole 12 and a peripheral of the positioning bolt 13 is ranged in the side positioning groove 23. A locking screw 14 is screwed at the positioning hole 12 and abutted against and limited the positioning bolt 13 to prevent from separating from the positioning hole 12, shown as in FIGS. 1, 10, and 11.

Figure 11:
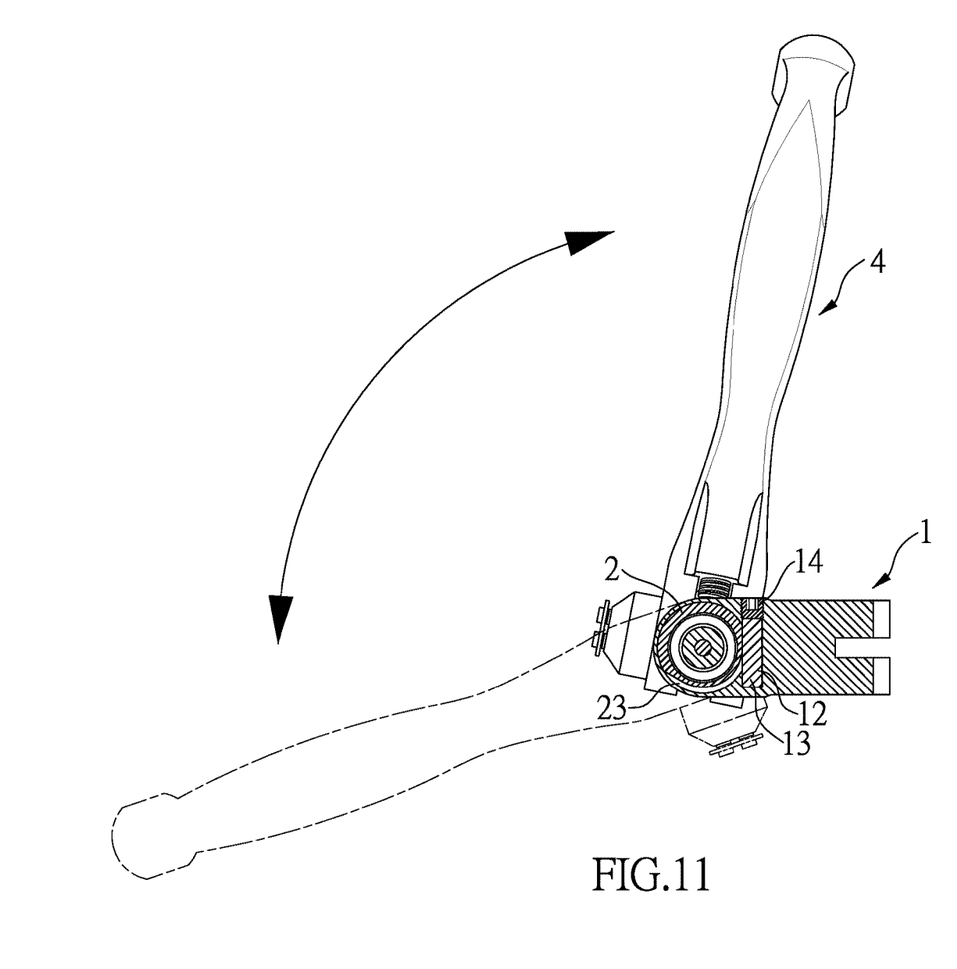
FIG. 11 is a cross-sectional view of the collapsible control lever of the present invention while the handle and a rotation seat are collapsible rotated relative to the assembling member.
Figure 12:
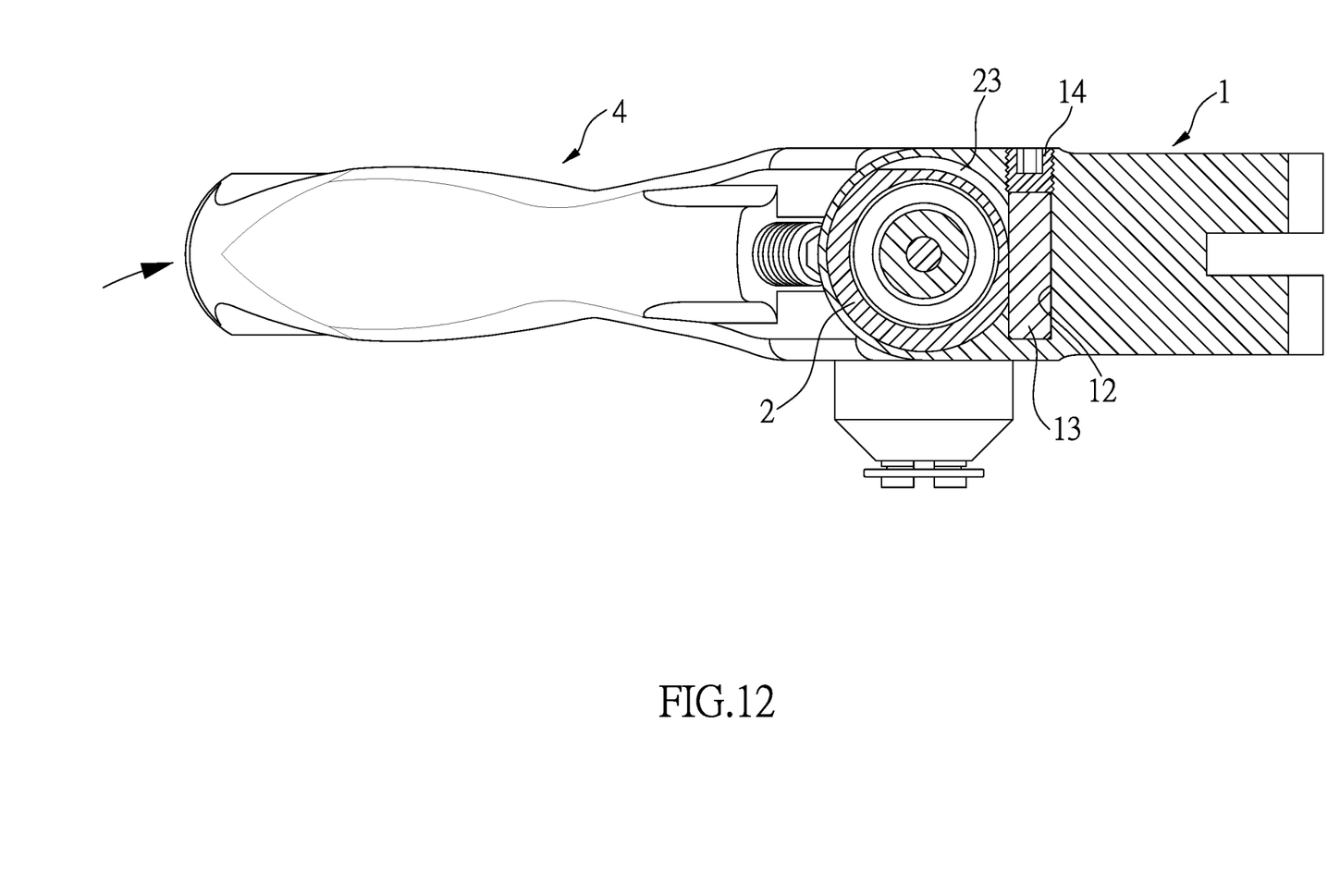
FIG. 12 is a view of the collapsible control lever of the present invention viewed in another angle while the handle is collapsible rotated relative to the assembling member.

It must be mentioned that the handle 4 is not limited to rotate in an one-way direction although the handle 4 is pivoted in an angle pivoting range of 120 degree which is drew with a dash line and a solid line in FIG. 11. It shows that the handle 4 has the angle pivoting range of 120 degree while the handle 4 is influenced by the external force. After the external force is removed, the handle 4 is reset by the first torsion spring 3 so that the handle 4 may be rotated in the angle pivoting range of 120 degree. An extension length of the arc side positioning groove 23 is 0.334 of a circumference of the rotation seat 2 to meet the angle pivoting range of 120 degree what the rotation seat 2 (handle 4) is relative to the assembling member 1. In FIG. 12, the handle 4 is individually rotated relative to the assembling member 1 in the front direction the vehicle.

Figure 13:
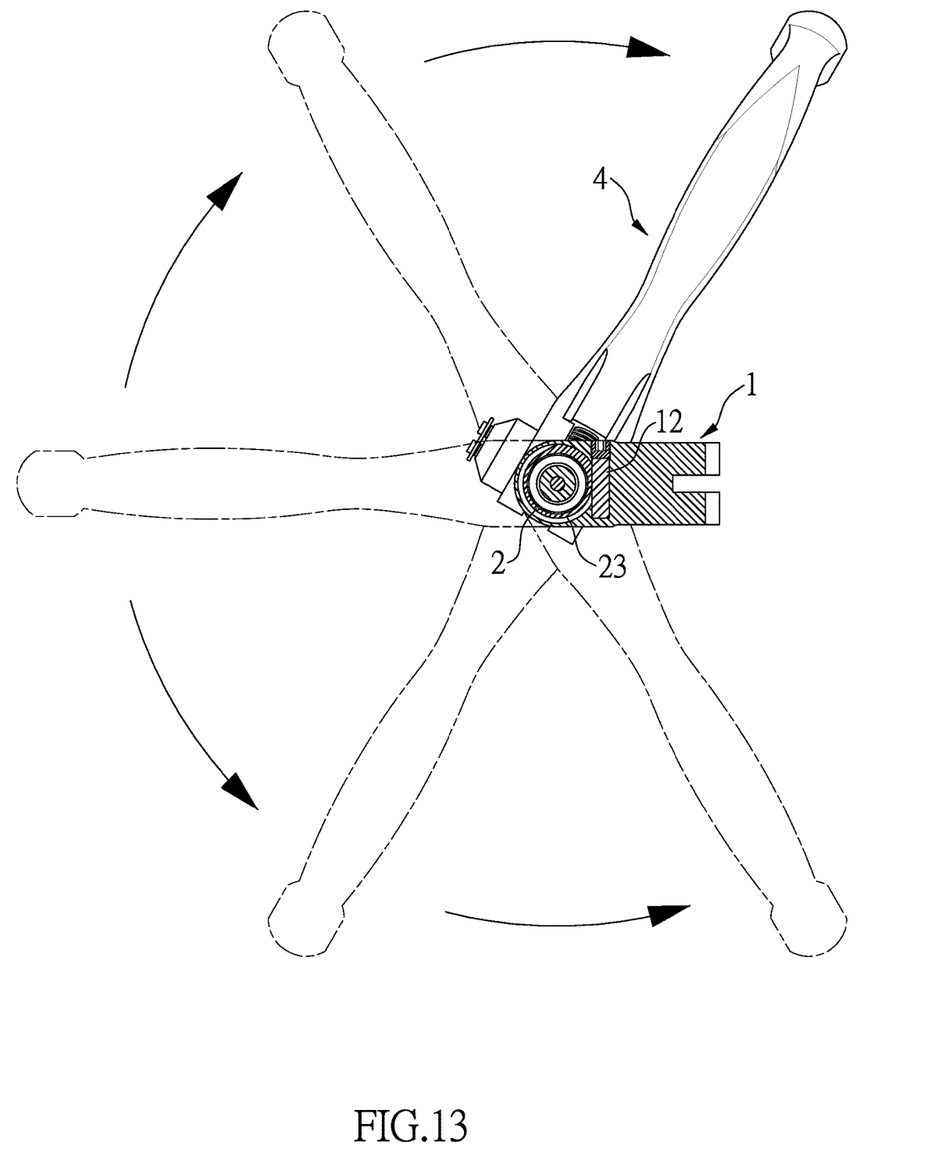
FIG. 13 is a cross-sectional view of another embodiment of the collapsible control lever of the present invention while the handle and the rotation seat are collapsible rotated relative to the assembling member.
Figure 14:
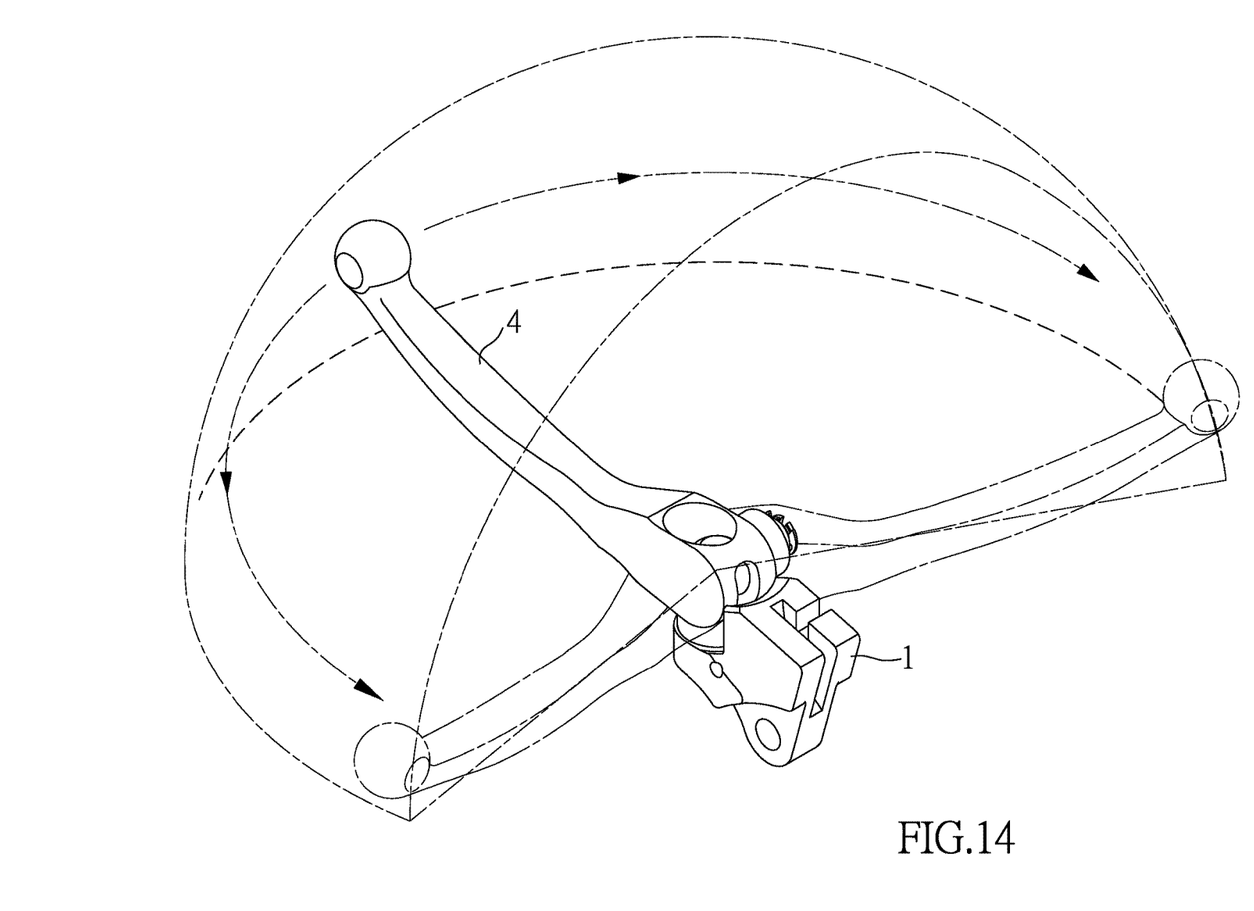
FIG. 14 is a perspective view of the collapsible control lever of the present invention while the handle and the rotation seat are collapsible rotated.

Please refer to FIGS. 13 and 14, the extension length of the arc side positioning groove 23 is 0.667 of the circumference of the rotation seat 2. According to above mentioned structure, the handle 4 and the rotation seat 2 are together rotated relative to the assembling member 1 in an angle pivoting range of 240 degree. The volume of the cylinder 43 and the cover bushing 7 may be reduced or the distance between the assembly portion 11 and the assembling member 1 may be increased to prevent the limitation and rotation of the handle 4 and the rotation seat 2 relative to assembling member 1 from colliding and further successfully achieve to rotate in the above mentioned angle pivoting range.

The collapsible control lever of the present invention belongs to the type of two pieces and one axis. Although the collapsible control lever of the present invention is similar to U.S. Pat. No. 6,393,936, U.S. Pat. No. 6,578,445, and U.S. Pat. No. 7,921,747, the surface of the ball socket 41 of the handle 4 of the present invention is freely pivoted (oscillated) and moved non-directionally relative to the surface of the ball head 51. Compared to the prior arts, the rotation range of the present invention is not limited very much so that the handle 4 may be operated forward and backward, upward and downward, and/or forward and backward. That is, there are much more moving angles, such as the spherical track, if pivoting (oscillating) in an inclined direction. Compared to U.S. Pat. No. 6,047,611, the present invention is simplified with one piece and one axis. It is not only simplified the assembly and the number of the elements, but also has much more pivoting (oscillating) range. At the same time, the handle 4 may be reset after pivoting (oscillating).

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A collapsible control lever, comprising an assembling member, a rotation seat, a first torsion spring, a handle, and a pivoting rod, wherein:
   the assembling member has an assembly portion, one of two ends of the rotation seat is pivotably connected to the assembly portion, two ends of the first torsion spring are respectively fixed to the assembly portion and the rotation seat, and the rotation seat is pivoted relative to the assembly portion and then reset by the first torsion spring; and
   a ball socket is arranged at one end of the handle, a ball head is arranged at one of two ends of the pivoting rod and pivoted at the ball socket, and the other one of the two ends of the pivoting rod opposite to the ball head is assembled to the rotation seat, and a surface of the ball socket of the handle is freely pivoted or oscillated and moved non-directionally relative to a surface of the ball head.

2. The collapsible control lever as claimed in claim 1, wherein the handle has a cross groove communicating with the ball socket, the rotation seat has a through hole, the pivoting rod includes an assembly section connected with the ball head, the assembly section of the pivoting rod passes through the cross groove and pivoted to one end of the through hole and then a fixing screw passes through the assembly portion and is screwed into the assembly section for fixing.

3. The collapsible control lever as claimed in claim 2, wherein an adjusting screw hole is formed in the cross groove, a convex block is arranged at the other one of the two ends of the rotation seat extended outwardly and toward the cross groove, one of two ends of an adjusting screw is screwed into the adjusting screw hole and axially moved relative to the adjusting screw hole so that the other one of the two ends of the adjusting screw opposite to the end screwed into the adjusting screw hole is protruded to the cross groove and abutted against and limited a surface of the convex block.

4. The collapsible control lever as claimed in claim 2, wherein the cross groove of the handle provides a moving range of the assembly section of the pivoting rod while the handle is folded and rotated forwardly, and the handle is folded and rotated forwardly by a maximum angle of 120 degrees relative to the ball head of the pivoting rod.

5. The collapsible control lever as claimed in claim 1, wherein the handle is extended to form a cylinder arranged adjacent to the ball socket, the collapsible control lever further comprises a second torsion spring covering the cylinder, two ends of the second torsion spring are respectively fixed to the cylinder and the rotation seat, and the handle is pivoted relative to the pivoting rod and then reset by the second torsion spring.

6. The collapsible control lever as claimed in claim 5, further comprising a cover bushing for covering the cylinder and shielding the second torsion spring, a concave groove is arranged at a tail end of the cylinder in an axial direction, and a fixing member is embedded in the concave groove and abutted against a surface of the cover bushing so that the cover bushing is positioned at the cylinder.

7. The collapsible control lever as claimed in claim 6, wherein an arc side positioning groove is arranged at a peripheral of the rotation seat along a rotating direction, the assembling member has a positioning hole communicating with the assembly portion, a positioning bolt passing through the positioning hole and a peripheral of the positioning bolt is located within the arc side positioning groove, and a locking screw screwed into the positioning hole and abuts against and limits the positioning bolt to prevent from separating from the positioning hole.

8. The collapsible control lever as claimed in claim 7, wherein the arc side positioning groove is ranged between 0.334 and 0.667 of a circumference of the rotation seat for providing the rotation seat to rotate relative to the assembling member between an angle of 120 degrees to 240 degrees.

* * * * *